United States Patent
Terpstra

(10) Patent No.: US 12,271,309 B2
(45) Date of Patent: Apr. 8, 2025

(54) RELATIVE AGE TRACKING FOR ENTRIES IN A BUFFER

(71) Applicant: SiFive, Inc., San Mateo, CA (US)

(72) Inventor: Wesley Waylon Terpstra, San Mateo, CA (US)

(73) Assignee: SiFive, Inc., Santa Clara, CA (US)

( * ) Notice: Subject to any disclaimer, the term of this patent is extended or adjusted under 35 U.S.C. 154(b) by 0 days.

(21) Appl. No.: 18/527,181

(22) Filed: Dec. 1, 2023

(65) Prior Publication Data

US 2024/0184696 A1 Jun. 6, 2024

Related U.S. Application Data

(60) Provisional application No. 63/429,975, filed on Dec. 2, 2022.

(51) Int. Cl.
*G06F 12/08* (2016.01)
*G06F 12/0802* (2016.01)

(52) U.S. Cl.
CPC .. *G06F 12/0802* (2013.01); *G06F 2212/6024* (2013.01)

(58) Field of Classification Search
CPC .............. G06F 12/0802; G06F 2212/6024
See application file for complete search history.

(56) References Cited

U.S. PATENT DOCUMENTS

2006/0282622 A1* 12/2006 Sistla ................ G06F 12/0811
711/146

* cited by examiner

*Primary Examiner* — Jae U Yu
(74) *Attorney, Agent, or Firm* — Kilpatrick Townsend & Stockton LLP

(57) ABSTRACT

Systems and techniques are disclosed for relative age tracking for entries in a buffer. For example, some techniques may include pre-computing age matrix entries of an age matrix corresponding to invalid entries of a data buffer based on a validity indication (e.g., a valid bit mask), wherein the validity indication identifies valid entries in the data buffer and the age matrix tracks relative ages of the entries in the data buffer; responsive to data being received for storage in the data buffer, selecting an entry corresponding to an index value in the data buffer from among a set of invalid entries of the data buffer; storing the data in the entry corresponding to the index value; and updating the validity indication to indicate that the entry corresponding to the index value is valid.

20 Claims, 11 Drawing Sheets

FIG. 1A (prior art)

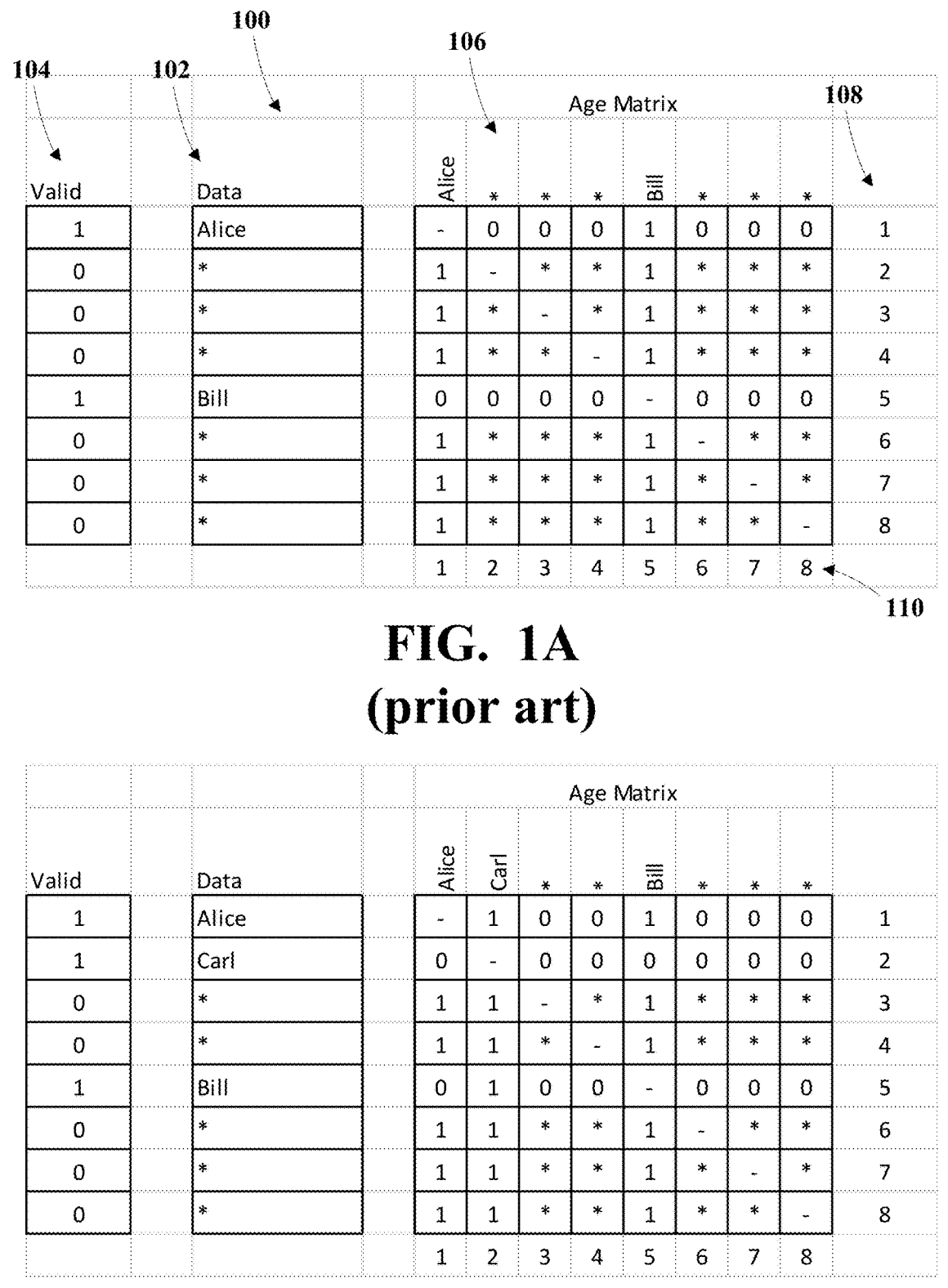

| Valid | Data | Alice | * | * | * | Bill | * | * | * | |
|---|---|---|---|---|---|---|---|---|---|---|
| 1 | Alice | - | 0 | 0 | 0 | 1 | 0 | 0 | 0 | 1 |
| 0 | * | 1 | - | * | * | 1 | * | * | * | 2 |
| 0 | * | 1 | * | - | * | 1 | * | * | * | 3 |
| 0 | * | 1 | * | * | - | 1 | * | * | * | 4 |
| 1 | Bill | 0 | 0 | 0 | 0 | - | 0 | 0 | 0 | 5 |
| 0 | * | 1 | * | * | * | 1 | - | * | * | 6 |
| 0 | * | 1 | * | * | * | 1 | * | - | * | 7 |
| 0 | * | 1 | * | * | * | 1 | * | * | - | 8 |
| | | 1 | 2 | 3 | 4 | 5 | 6 | 7 | 8 | |

FIG. 1B (prior art)

| Valid | Data | Alice | Carl | * | * | Bill | * | * | * | |
|---|---|---|---|---|---|---|---|---|---|---|
| 1 | Alice | - | 1 | 0 | 0 | 1 | 0 | 0 | 0 | 1 |
| 1 | Carl | 0 | - | 0 | 0 | 0 | 0 | 0 | 0 | 2 |
| 0 | * | 1 | 1 | - | * | 1 | * | * | * | 3 |
| 0 | * | 1 | 1 | * | - | 1 | * | * | * | 4 |
| 1 | Bill | 0 | 1 | 0 | 0 | - | 0 | 0 | 0 | 5 |
| 0 | * | 1 | 1 | * | * | 1 | - | * | * | 6 |
| 0 | * | 1 | 1 | * | * | 1 | * | - | * | 7 |
| 0 | * | 1 | 1 | * | * | 1 | * | * | - | 8 |
| | | 1 | 2 | 3 | 4 | 5 | 6 | 7 | 8 | |

Age Matrix

| Valid | Data  | Alice | Carl | * | * | Bill | Daryl | * | *  |   |
|-------|-------|-------|------|---|---|------|-------|---|----|---|
| 1     | Alice | -     | 1    | 0 | 0 | 1    | 1     | 0 | 0  | 1 |
| 1     | Carl  | 0     | -    | 0 | 0 | 0    | 1     | 0 | 0  | 2 |
| 0     | *     | 1     | 1    | - | * | 1    | 1     | * | *  | 3 |
| 0     | *     | 1     | 1    | * | - | 1    | 1     | * | *  | 4 |
| 1     | Bill  | 0     | 1    | 0 | 0 | -    | 1     | 0 | 0  | 5 |
| 1     | Daryl | 0     | 0    | 0 | 0 | 0    | -     | 0 | 0  | 6 |
| 0     | *     | 1     | 1    | * | * | 1    | 1     | - | *  | 7 |
| 0     | *     | 1     | 1    | * | * | 1    | 1     | * | -  | 8 |
|       |       | 1     | 2    | 3 | 4 | 5    | 6     | 7 | 8  |   |

FIG. 1C
(prior art)

Age Matrix

| Valid | Data  | Alice | Carl | * | Eddy | Bill | Daryl | * | *  |   |
|-------|-------|-------|------|---|------|------|-------|---|----|---|
| 1     | Alice | -     | 1    | 0 | 1    | 1    | 1     | 0 | 0  | 1 |
| 1     | Carl  | 0     | -    | 0 | 1    | 0    | 1     | 0 | 0  | 2 |
| 0     | *     | 1     | 1    | - | 1    | 1    | 1     | * | *  | 3 |
| 1     | Eddy  | 0     | 0    | 0 | -    | 0    | 0     | 0 | 0  | 4 |
| 1     | Bill  | 0     | 1    | 0 | 1    | -    | 1     | 0 | 0  | 5 |
| 1     | Daryl | 0     | 0    | 0 | 1    | 0    | -     | 0 | 0  | 6 |
| 0     | *     | 1     | 1    | * | 1    | 1    | 1     | - | *  | 7 |
| 0     | *     | 1     | 1    | * | 1    | 1    | 1     | * | -  | 8 |
|       |       | 1     | 2    | 3 | 4    | 5    | 6     | 7 | 8  |   |

| Valid (502) | Data (506) | Age Matrix (504) | | | | | | | | |
|---|---|---|---|---|---|---|---|---|---|---|
| | | * | * | * | * | * | * | * | * | |
| 0 | * | - | 1 | 1 | 1 | 1 | 1 | 1 | 1 | 1 |
| 0 | * | 0 | - | 1 | 1 | 1 | 1 | 1 | 1 | 2 |
| 0 | * | 0 | 0 | - | 1 | 1 | 1 | 1 | 1 | 3 |
| 0 | * | 0 | 0 | 0 | - | 1 | 1 | 1 | 1 | 4 |
| 0 | * | 0 | 0 | 0 | 0 | - | 1 | 1 | 1 | 5 |
| 0 | * | 0 | 0 | 0 | 0 | 0 | - | 1 | 1 | 6 |
| 0 | * | 0 | 0 | 0 | 0 | 0 | 0 | - | 1 | 7 |
| 0 | * | 0 | 0 | 0 | 0 | 0 | 0 | 0 | - | 8 |
| | | 1 | 2 | 3 | 4 | 5 | 6 | 7 | 8 | |

FIG. 5B

| Valid (502) | Data (506) | Age Matrix (504) | | | | | | | | |
|---|---|---|---|---|---|---|---|---|---|---|
| | | Alice | * | * | * | * | * | * | Bob | |
| 1 | Alice | - | 1 | 1 | 1 | 1 | 1 | 1 | 1 | 1 |
| 0 | * | 0 | - | 1 | 1 | 1 | 1 | 1 | 1 | 2 |
| 0 | * | 0 | 0 | - | 1 | 1 | 1 | 1 | 1 | 3 |
| 0 | * | 0 | 0 | 0 | - | 1 | 1 | 1 | 1 | 4 |
| 0 | * | 0 | 0 | 0 | 0 | - | 1 | 1 | 1 | 5 |
| 0 | * | 0 | 0 | 0 | 0 | 0 | - | 1 | 1 | 6 |
| 0 | * | 0 | 0 | 0 | 0 | 0 | 0 | - | 1 | 7 |
| 1 | Bob | 0 | 0 | 0 | 0 | 0 | 0 | 0 | - | 8 |
| | | 1 | 2 | 3 | 4 | 5 | 6 | 7 | 8 | |

FIG. 5C

| Valid (502) | Data (506) | | | Age Matrix (504) | | | | | | |
|---|---|---|---|---|---|---|---|---|---|---|
| | | Alice | * | * | * | * | * | * | Bob | |
| 1 | Alice | - | 1 | 1 | 1 | 1 | 1 | 1 | 1 | 1 |
| 0 | * | 0 | - | 1 | 1 | 1 | 1 | 1 | 0 | 2 |
| 0 | * | 0 | 0 | - | 1 | 1 | 1 | 1 | 0 | 3 |
| 0 | * | 0 | 0 | 0 | - | 1 | 1 | 1 | 0 | 4 |
| 0 | * | 0 | 0 | 0 | 0 | - | 1 | 1 | 0 | 5 |
| 0 | * | 0 | 0 | 0 | 0 | 0 | - | 1 | 0 | 6 |
| 0 | * | 0 | 0 | 0 | 0 | 0 | 0 | - | 0 | 7 |
| 1 | Bob | 0 | 1 | 1 | 1 | 1 | 1 | 1 | - | 8 |
| | | 1 | 2 | 3 | 4 | 5 | 6 | 7 | 8 | |

FIG. 5D

| Valid (502) | Data (506) | | | Age Matrix (504) | | | | | | |
|---|---|---|---|---|---|---|---|---|---|---|
| | | Alice | * | * | * | Charles | * | * | Bob | |
| 1 | Alice | - | 1 | 1 | 1 | 1 | 1 | 1 | 1 | 1 |
| 0 | * | 0 | - | 1 | 1 | 1 | 1 | 1 | 0 | 2 |
| 0 | * | 0 | 0 | - | 1 | 1 | 1 | 1 | 0 | 3 |
| 0 | * | 0 | 0 | 0 | - | 1 | 1 | 1 | 0 | 4 |
| 1 | Charles | 0 | 0 | 0 | 0 | - | 1 | 1 | 0 | 5 |
| 0 | * | 0 | 0 | 0 | 0 | 0 | - | 1 | 0 | 6 |
| 0 | * | 0 | 0 | 0 | 0 | 0 | 0 | - | 0 | 7 |
| 1 | Bob | 0 | 1 | 1 | 1 | 1 | 1 | 1 | - | 8 |
| | | 1 | 2 | 3 | 4 | 5 | 6 | 7 | 8 | |

FIG. 5E

| Valid (502) | Data (506) | | | | Age Matrix (504) | | | | | |
|---|---|---|---|---|---|---|---|---|---|---|
| | | Alice | * | * | * | Charles | * | * | Bob | |
| 1 | Alice | - | 1 | 1 | 1 | 1 | 1 | 1 | 1 | 1 |
| 0 | * | 0 | - | 1 | 1 | 0 | 1 | 1 | 0 | 2 |
| 0 | * | 0 | 0 | - | 1 | 0 | 1 | 1 | 0 | 3 |
| 0 | * | 0 | 0 | 0 | - | 0 | 1 | 1 | 0 | 4 |
| 1 | Charles | 0 | 1 | 1 | 1 | - | 1 | 1 | 0 | 5 |
| 0 | * | 0 | 0 | 0 | 0 | 0 | - | 1 | 0 | 6 |
| 0 | * | 0 | 0 | 0 | 0 | 0 | 0 | - | 0 | 7 |
| 1 | Bob | 0 | 1 | 1 | 1 | 1 | 1 | 1 | - | 8 |
| | | 1 | 2 | 3 | 4 | 5 | 6 | 7 | 8 | |

FIG. 5F

| Valid (502) | Data (506) | | | | Age Matrix (504) | | | | | |
|---|---|---|---|---|---|---|---|---|---|---|
| | | Alice | David | * | * | Charles | * | * | Bob | |
| 1 | Alice | - | 1 | 1 | 1 | 1 | 1 | 1 | 1 | 1 |
| 1 | David | 0 | - | 1 | 1 | 0 | 1 | 1 | 0 | 2 |
| 0 | * | 0 | 0 | - | 1 | 0 | 1 | 1 | 0 | 3 |
| 0 | * | 0 | 0 | 0 | - | 0 | 1 | 1 | 0 | 4 |
| 1 | Charles | 0 | 1 | 1 | 1 | - | 1 | 1 | 0 | 5 |
| 0 | * | 0 | 0 | 0 | 0 | 0 | - | 1 | 0 | 6 |
| 0 | * | 0 | 0 | 0 | 0 | 0 | 0 | - | 0 | 7 |
| 1 | Bob | 0 | 1 | 1 | 1 | 1 | 1 | 1 | - | 8 |
| | | 1 | 2 | 3 | 4 | 5 | 6 | 7 | 8 | |

| Valid | Data | Age Matrix ||||||||  |
|---|---|---|---|---|---|---|---|---|---|---|
|  |  | Alice | David | Eric | Fiona | Charles | George | * | Bob |  |
| 1 | Alice | - | 1 | 1 | 1 | 1 | 1 | 1 | 1 | 1 |
| 1 | David | 0 | - | 1 | 1 | 0 | 1 | 1 | 0 | 2 |
| 1 | Eric | 0 | 0 | - | 1 | 0 | 1 | 1 | 0 | 3 |
| 1 | Fiona | 0 | 0 | 0 | - | 0 | 1 | 1 | 0 | 4 |
| 1 | Charles | 0 | 1 | 1 | 1 | - | 1 | 1 | 0 | 5 |
| 1 | George | 0 | 0 | 0 | 0 | 0 | - | 1 | 0 | 6 |
| 0 | * | 0 | 0 | 0 | 0 | 0 | 0 | - | 0 | 7 |
| 1 | Bob | 0 | 1 | 1 | 1 | 1 | 1 | 1 | - | 8 |
|  |  | 1 | 2 | 3 | 4 | 5 | 6 | 7 | 8 |  |

FOR EACH AGE MATRIX ENTRY HAVING A ROW INDEX CORRESPONDING TO AN INDEX OF A VALID ENTRY OF THE DATA BUFFER AND A COLUMN INDEX CORRESPONDING TO AN INDEX OF AN INVALID ENTRY OF THE DATA BUFFER, SET AN AGE BIT OF THE AGE MATRIX ENTRY TO A FIRST VALUE INDICATING THAT DATA STORED IN A FIRST ENTRY HAVING A FIRST INDEX CORRESPONDING TO THE ROW INDEX OF THE AGE MATRIX ENTRY IS OLDER THAN DATA STORED IN A SECOND ENTRY HAVING A SECOND INDEX CORRESPONDING THE COLUMN INDEX OF THE AGE MATRIX ENTRY

704

FOR EACH AGE MATRIX ENTRY HAVING A ROW INDEX CORRESPONDING TO AN INDEX OF AN INVALID ENTRY OF THE DATA BUFFER AND A COLUMN INDEX CORRESPONDING TO AN INDEX OF A VALID ENTRY OF THE DATA BUFFER, SET AN AGE BIT OF THE AGE MATRIX ENTRY TO A SECOND VALUE INDICATING THAT THE DATA STORED IN A FIRST ENTRY HAVING A FIRST INDEX CORRESPONDING TO THE ROW INDEX OF THE AGE MATRIX ENTRY IS OLDER THAN DATA STORED IN A SECOND ENTRY HAVING A SECOND INDEX CORRESPONDING TO THE COLUMN INDEX OF THE AGE MATRIX ENTRY

706

FOR EACH AGE MATRIX ENTRY HAVING A ROW INDEX CORRESPONDING TO AN INDEX OF AN INVALID ENTRY OF THE DATA BUFFER, A COLUMN INDEX CORRESPONDING TO AN INDEX OF AN INVALID ENTRY OF THE DATA BUFFER, AND WHEREIN THE ROW INDEX IS LOWER THAN THE COLUMN INDEX, SET AN AGE BIT OF THE AGE MATRIX ENTRY TO THE FIRST VALUE

FIG. 7

RELATIVE AGE TRACKING FOR ENTRIES IN A BUFFER

CROSS-REFERENCE TO RELATED APPLICATION

This application claims priority to and the benefit of U.S. Provisional Patent Application Ser. No. 63/429,975, filed Dec. 2, 2022, the entire disclosure of which is hereby incorporated by reference.

TECHNICAL FIELD

This disclosure relates generally to buffers, and more specifically, to relative age tracking for entries in a buffer.

BACKGROUND

A central processing unit (CPU) or processor core may be implemented according to a particular microarchitecture. As used herein, a "microarchitecture" refers to the way an instruction set architecture (ISA) (e.g., the RISC-V instruction set) is implemented by a processor core. A microarchitecture may be implemented by various components, such as dispatch units, execution units, registers, caches, queues, data paths, and/or other logic associated with instruction flow. A processor core may execute instructions in a pipeline based on the microarchitecture that is implemented.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 1A through FIG. 1D are visual examples of a data structure being updated for relative age tracking for entries in a buffer.

FIGS. 5A through 5G illustrate visual examples of data structures for relative age tracking for entries in a buffer.

FIG. 7 is a flow chart of an example of a technique for pre-computing age matrix entries of an age matrix corresponding to invalid entries of a data buffer based on a validity indication for entries in the data buffer.

DETAILED DESCRIPTION

Figure 2:
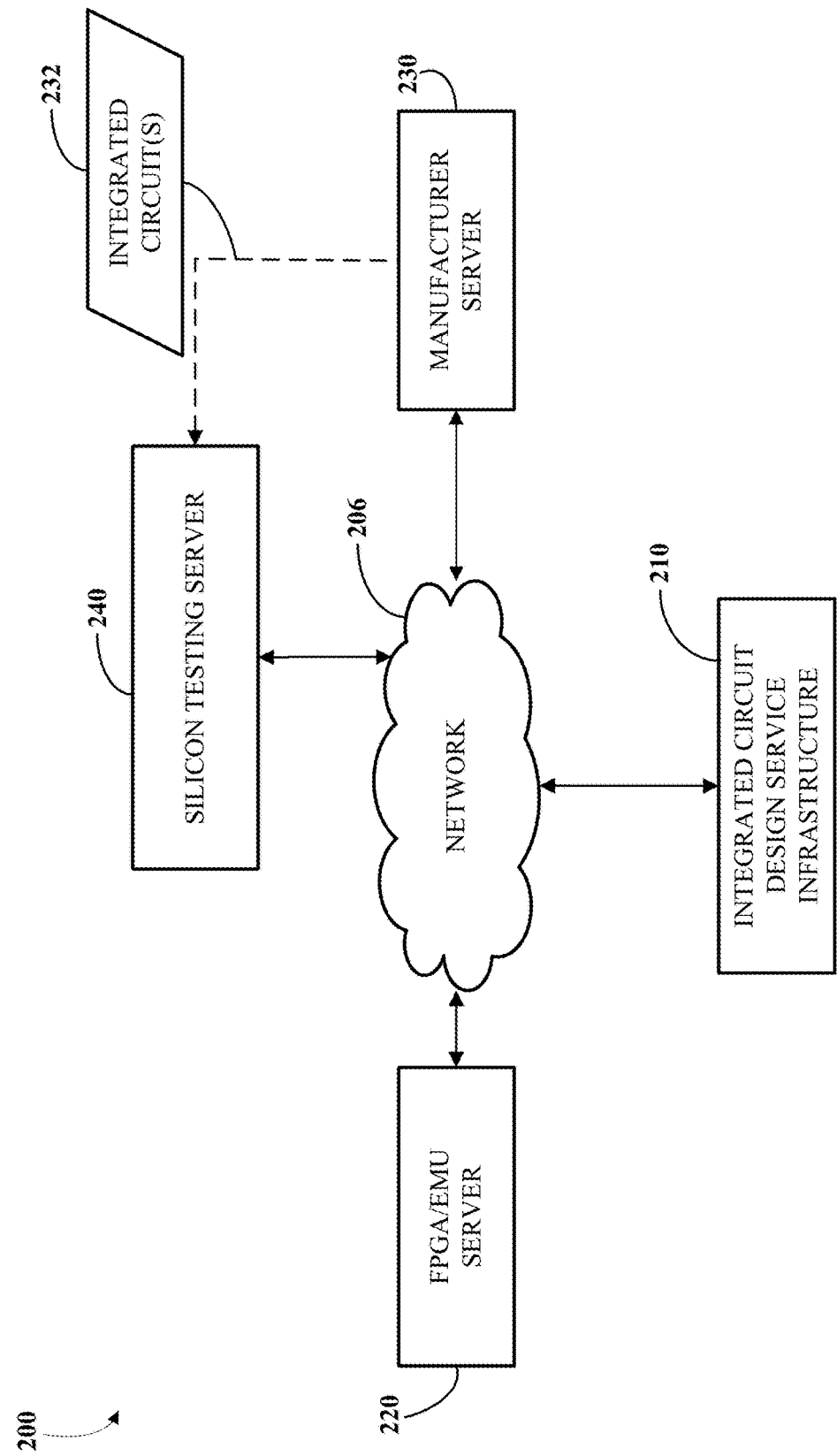
FIG. 2 is a block diagram of an example of a system for generation and manufacture of integrated circuits.

A processor or processor core may execute instructions in a pipeline based on the microarchitecture implemented by the processor or processor core. The pipeline may be implemented by various components, such as decode units, rename units, dispatch units, execution units, registers, caches, queues, data paths, and/or other logic associated with an instruction flow. The various components may require buffers for temporary storage of data. A buffer typically arranges entries in the order in which they are written to, i.e., consecutively. The order in which the entries are read out depends on the type of buffer. In an ordered buffer, the entries may be read out in an order that is dependent on the order in which they entries were written to. For example, in a first in, first out (FIFO) buffer the entry that was first written to is always read out first and in a first in, last out (FILO) buffer the entry that was last written to is always read out first. Out of order buffers allow an entry to be read out independent of the order in which the entry was written to.

In some buffers, it may be useful to track the order in which entries are written to, but still support reading out entries in an independent order. For example, it may be useful to support selection of an oldest entry or youngest entry from amongst a subset of the entries in the buffer. In some implementations, it may be useful to support the removal of entries from the buffer in a different order than they were added while continuing to track relative age of the entries. To accomplish this, the data structure 100 shown in FIG. 1A through FIG. 1D includes three data arrays. The data structure 100 shown in FIG. 1A through FIG. 1D is presented visually as three arrays but can appear differently when laid out as a circuit. The following descriptions will reference the data arrays, but it will be understood that the arrays are presented for understanding and actual implementations may not have the visual appearance of an array but will still include logical arrays having logical age matrix entries that can be referenced by logical row indexes and column indexes. In the following description, a script (i) will refer to a row index and a script (j) will refer to a column index. A buffer 102 data array stores values being buffered in a series of entries, a valid bit mask 104 data array indicates entries in the buffer 102 that are populated with valid data, and an age matrix 106 data array tracks the relative age of values in each entry of the buffer 102. The buffer 102 is represented as a single column data array with a row index that corresponds to each entry. The valid bit mask 104 is also represented as a single column data array with a row index that corresponds to each entry. While the buffer 102 and the valid bit mask 104 are shown as single column data arrays, implementations of the disclosure do not require the use of a single column data arrays and other arrangements are possible as long as the entries are indexed and each bit in the valid bit mask 104 is indexed to an entry in the buffer 102. The age matrix 106 is comprised of age matrix entries with the rows indexed corresponding to the buffer index and the columns similarly indexed corresponding to the buffer index. The figures illustrate row number labels 108 and column number labels 110 for the age matrix 106 for referring to particular rows, columns, and age matrix entries, but the row number labels 108 and column number labels 110 are for reference purposes and are not a part of the data structure. Similarly, the age matrix 106 is shown with a value stored in an entry corresponding to the column index (e.g., FIG. 1 shows the names Alice and Bill above the top row of the age matrix 106), but in actually implementations the value may not be stored in the age matrix 106. In the following examples, a binary value of 1 indicates that for age matrix entry(i,j), entry(i) in the buffer is older that entry(j) in the buffer. A binary value of 0 indicates that for age matrix entry(i, j), entry(i) in the buffer is newer that entry(j) in the buffer. These values are chosen arbitrarily, and implementations of the disclosure are not limited to the use of a binary 1 for older and a binary 0 for newer. Other values can be used, and the described techniques can be modified to use the other values.

The entries in the buffer 102 can be read out in either an arbitrary order by referencing the index of the entry or in a sequential order by referencing the age matrix 106 to find the most recent entry written to or the oldest entry written to. For example, the oldest entry written to in the age matrix 106 is the entry whose index corresponds to a row that has all values of 1 for each valid column. A valid column, or a valid row is a row or column that has an index corresponding to an index of a valid bit in the valid bit mask 104. The newest entry is the entry in the age matrix that has all values of 0 for each valid column. The example of FIG. 1 has a first entry of Alice in row(1) and Bill in row(5). Row(1) of the age matrix has a value of 1 in column(5) for Bill (the only valid column) and row(1) therefore corresponds the oldest entry written to.

Conventionally, an age matrix 106 needs to be updated each time a new value is received at the buffer 102. This is performed by randomly selecting an entry(r) to store the value and then filling row(r) of the age matrix 106 with values of 0 to indicate that entry(r) is not older than the values stored in the other entries. Column(r) of the age matrix is filled with values of 1 to indicate that every value stored in the other entries is older than the value stored in the new entry. The general formula used to populate the data structures with a value V is given by:

| | |
|---|---|
| Valid Bit Mask(k)=1 | |
| Buffer(k)=V | |
| AgeMatrix(k,*) = 0 | V is not older than any other value |
| AgeMatrix(*,k) = 1 | All values are older than V |

The application of this formula is shown in FIG. 2 in which a new value, Carl, is added to the entry(2). The formula can be shown as:

Valid Bit Mask(2)=1

Buffer(2)=Carl

AgeMatrix(2,*)=0

AgeMatrix(*,2)=1

After application of the formula, Row(2) has all values of 0 for each valid column and column(2) has all values of 1 for each valid column. This process is repeated in FIGS. 1C and 1D using the value of Daryl stored in Buffer(6) in FIG. 1C and Eddy stored in Buffer(4) in FIG. 1D to illustrate how the age matrix 106 is filled conventionally. This process is effective for tracking the age of the value in the entries, but results in 2 updates to the age matrix entries in the age matrix 106 each time a value is added to the buffer 102. For the three updates described in relation to FIG. 1A through FIG. 1D, there are a total of 6 updates to the age matrix 106 for every valid age matrix entry. The large number of updates is expensive since the age matrix 106 includes a large number of age matrix entries and the large number of updates presents a potential timing problem. Each time a value is stored in an entry, the age matrix 106 needs to be updated in sequential order to track the relative age properly.

Implementations of this disclosure are designed to improve the performance of relative age tracking in a buffer using predetermined age matrix values for unoccupied slots in the buffer with a fixed buffer entry allocation order (e.g., ascending index order) for those unoccupied slots. The implementations use an age matrix update circuitry to predetermine the bit values in the age matrix entries of an age matrix in manner such that the age matrix does not need to be updated after receiving new values for the buffer entries. The predetermination of the bit values of the age matrix decouples filling the buffer entries from updating the age matrix and results in fewer logical circuits required to update the age matrix. Not only is the process faster, but it can be performed independent of the timing of storing values in the buffer. This approach may also enable the allocation of multiple entries in the buffer simultaneously (e.g., within a single clock cycle) without the additional circuit complexity for chaining the allocations.

As used herein, the term "circuitry" refers to an arrangement of electronic components (e.g., transistors, resistors, capacitors, and/or inductors) that is structured to implement one or more functions. For example, a circuitry may include one or more transistors interconnected to form logic gates that collectively implement a logical function.

As used herein, the term "entry" corresponds to a storage location in a data structure can be identified by an index such as a row number and column number.

To describe some implementations in greater detail, reference is first made to examples of hardware and software structures used to implement a system including components that may utilize an age matrix as described in this disclosure. FIG. 2 is a block diagram of an example of a system 200 for generation and manufacture of integrated circuits. The system 200 includes a network 206, an integrated circuit design service infrastructure 210 (e.g., integrated circuit generator), a field programmable gate array (FPGA)/emulator server 120, and a manufacturer server 230. For example, a user may utilize a web client or a scripting application program interface (API) client to command the integrated circuit design service infrastructure 210 to automatically generate an integrated circuit design based on a set of design parameter values selected by the user for one or more template integrated circuit designs. In some implementations, the integrated circuit design service infrastructure 210 may be configured to generate an integrated circuit design like the integrated circuit design shown and described in FIG. 4.

The integrated circuit design service infrastructure 210 may include a register-transfer level (RTL) service module configured to generate an RTL data structure for the integrated circuit based on a design parameters data structure. For example, the RTL service module may be implemented as Scala code. For example, the RTL service module may be implemented using Chisel. For example, the RTL service module may be implemented using flexible intermediate representation for register-transfer level (FIRRTL) and/or a FIRRTL compiler. For example, the RTL service module may be implemented using Diplomacy. For example, the RTL service module may enable a well-designed chip to be automatically developed from a high level set of configuration settings using a mix of Diplomacy, Chisel, and FIRRTL. The RTL service module may take the design parameters data structure (e.g., a java script object notation (JSON) file) as input and output an RTL data structure (e.g., a Verilog file) for the chip.

In some implementations, the integrated circuit design service infrastructure 210 may invoke (e.g., via network communications over the network 206) testing of the resulting design that is performed by the FPGA/emulation server 220 that is running one or more FPGAs or other types of hardware or software emulators. For example, the integrated circuit design service infrastructure 210 may invoke a test using a field programmable gate array, programmed based on a field programmable gate array emulation data structure, to obtain an emulation result. The field programmable gate array may be operating on the FPGA/emulation server 220, which may be a cloud server. Test results may be returned by the FPGA/emulation server 220 to the integrated circuit design service infrastructure 210 and relayed in a useful format to the user (e.g., via a web client or a scripting API client).

The integrated circuit design service infrastructure 210 may also facilitate the manufacture of integrated circuits using the integrated circuit design in a manufacturing facility associated with the manufacturer server 230. In some implementations, a physical design specification (e.g., a graphic data system (GDS) file, such as a GDSII file) based on a physical design data structure for the integrated circuit is transmitted to the manufacturer server 230 to invoke manufacturing of the integrated circuit (e.g., using manufacturing equipment of the associated manufacturer). For example, the manufacturer server 230 may host a foundry tape-out website that is configured to receive physical design specifications (e.g., such as a GDSII file or an open artwork system interchange standard (OASIS) file) to schedule or otherwise facilitate fabrication of integrated circuits. In some implementations, the integrated circuit design service infrastructure 210 supports multi-tenancy to allow multiple integrated circuit designs (e.g., from one or more users) to share fixed costs of manufacturing (e.g., reticle/mask generation, and/or shuttles wafer tests). For example, the integrated circuit design service infrastructure 210 may use a fixed package (e.g., a quasi-standardized packaging) that is defined to reduce fixed costs and facilitate sharing of reticle/ mask, wafer test, and other fixed manufacturing costs. For example, the physical design specification may include one or more physical designs from one or more respective physical design data structures in order to facilitate multi-tenancy manufacturing.

In response to the transmission of the physical design specification, the manufacturer associated with the manufacturer server 230 may fabricate and/or test integrated circuits based on the integrated circuit design. For example, the associated manufacturer (e.g., a foundry) may perform optical proximity correction (OPC) and similar post-tape-out/pre-production processing, fabricate the integrated circuit(s) 232, update the integrated circuit design service infrastructure 210 (e.g., via communications with a controller or a web application server) periodically or asynchronously on the status of the manufacturing process, perform appropriate testing (e.g., wafer testing), and send to a packaging house for packaging. A packaging house may receive the finished wafers or dice from the manufacturer and test materials and update the integrated circuit design service infrastructure 210 on the status of the packaging and delivery process periodically or asynchronously. In some implementations, status updates may be relayed to the user when the user checks in using the web interface, and/or the controller might email the user that updates are available.

In some implementations, the resulting integrated circuit (s) 232 (e.g., physical chips) are delivered (e.g., via mail) to a silicon testing service provider associated with a silicon testing server 240. In some implementations, the resulting integrated circuit(s) 232 (e.g., physical chips) are installed in a system controlled by the silicon testing server 240 (e.g., a cloud server), making them quickly accessible to be run and tested remotely using network communications to control the operation of the integrated circuit(s) 232. For example, a login to the silicon testing server 240 controlling a manufactured integrated circuit(s) 232 may be sent to the integrated circuit design service infrastructure 210 and relayed to a user (e.g., via a web client). For example, the integrated circuit design service infrastructure 210 may be used to control testing of one or more integrated circuit(s) 232.

Figure 3:
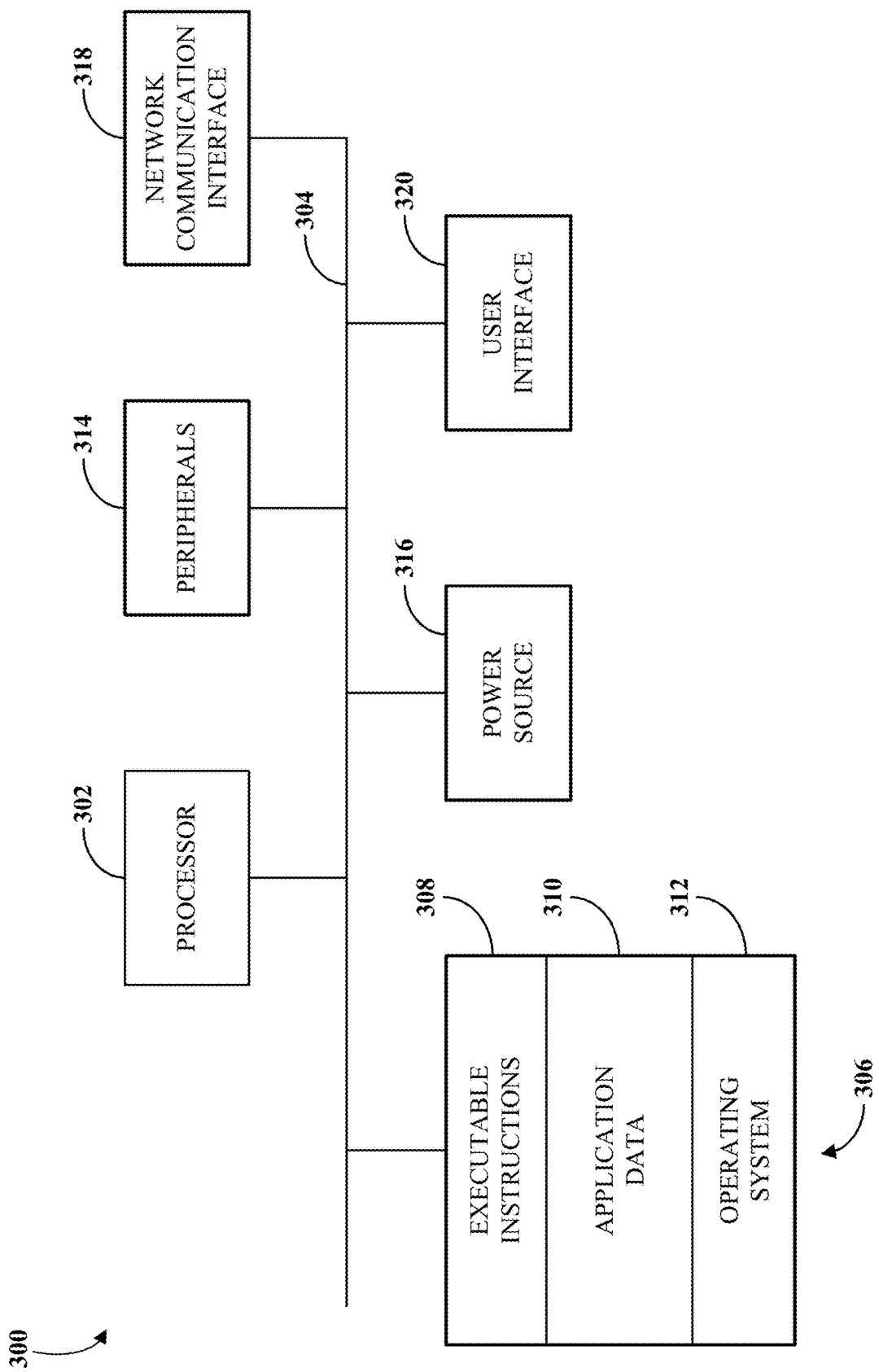
FIG. 3 is a block diagram of an example of a system for facilitating generation of integrated circuits, for facilitating generation of a circuit representation for an integrated circuit, and/or for programming or manufacturing an integrated circuit.

FIG. 3 is a block diagram of an example of a system 300 for facilitating generation of integrated circuits, for facilitating generation of a circuit representation for an integrated circuit, and/or for programming or manufacturing an integrated circuit. The system 300 is an example of an internal configuration of a computing device. The system 300 may be used to implement the integrated circuit design service infrastructure 210, and/or to generate a file that generates a circuit representation of an integrated circuit design like the integrated circuit design shown and described in FIG. 4.

The processor 302 can be a central processing unit (CPU), such as a microprocessor, and can include single or multiple processors having single or multiple processing cores. Alternatively, the processor 302 can include another type of device, or multiple devices, now existing or hereafter developed, capable of manipulating or processing information. For example, the processor 302 can include multiple processors interconnected in any manner, including hardwired or networked, including wirelessly networked. In some implementations, the operations of the processor 302 can be distributed across multiple physical devices or units that can be coupled directly or across a local area or other suitable type of network. In some implementations, the processor 302 can include a cache, or cache memory, for local storage of operating data or instructions.

The memory 306 can include volatile memory, non-volatile memory, or a combination thereof. For example, the memory 306 can include volatile memory, such as one or more dynamic random access memory (DRAM) modules such as double data rate (DDR) synchronous DRAM (SDRAM), and non-volatile memory, such as a disk drive, a solid-state drive, flash memory, Phase-Change Memory (PCM), or any form of non-volatile memory capable of persistent electronic information storage, such as in the absence of an active power supply. The memory 306 can include another type of device, or multiple devices, now existing or hereafter developed, capable of storing data or instructions for processing by the processor 302. The processor 302 can access or manipulate data in the memory 306 via the bus 304. Although shown as a single block in FIG. 2, the memory 306 can be implemented as multiple units. For example, a system 300 can include volatile memory, such as random access memory (RAM), and persistent memory, such as a hard drive or other storage.

The memory 306 can include executable instructions 308, data, such as application data 310, an operating system 312, or a combination thereof, for immediate access by the processor 302. The executable instructions 308 can include, for example, one or more application programs, which can be loaded or copied, in whole or in part, from non-volatile memory to volatile memory to be executed by the processor 302. The executable instructions 308 can be organized into programmable modules or algorithms, functional programs, codes, code segments, or combinations thereof to perform various functions described herein. For example, the executable instructions 308 can include instructions executable by the processor 302 to cause the system 300 to automatically, in response to a command, generate an integrated circuit design and associated test results based on a design parameters data structure. The application data 310 can include, for example, user files, database catalogs or dictionaries, configuration information or functional programs, such as a web browser, a web server, a database server, or a combination thereof. The operating system 312 can be, for example, Microsoft Windows®, macOS®, or Linux®; an operating system for a small device, such as a smartphone or tablet device; or an operating system for a large device, such as a mainframe computer. The memory 306 can comprise one or more devices and can utilize one or more types of storage, such as solid-state or magnetic storage.

The peripherals 314 can be coupled to the processor 302 via the bus 304. The peripherals 314 can be sensors or detectors, or devices containing any number of sensors or detectors, which can monitor the system 300 itself or the environment around the system 300. For example, a system 300 can contain a temperature sensor for measuring temperatures of components of the system 300, such as the processor 302. Other sensors or detectors can be used with the system 300, as can be contemplated. In some implementations, the power source 316 can be a battery, and the system 300 can operate independently of an external power distribution system. Any of the components of the system 300, such as the peripherals 314 or the power source 316, can communicate with the processor 302 via the bus 304.

The network communication interface 318 can also be coupled to the processor 302 via the bus 304. In some implementations, the network communication interface 318 can comprise one or more transceivers. The network communication interface 318 can, for example, provide a connection or link to a network, such as the network 206 shown in FIG. 1, via a network interface, which can be a wired network interface, such as Ethernet, or a wireless network interface. For example, the system 300 can communicate with other devices via the network communication interface 318 and the network interface using one or more network protocols, such as Ethernet, transmission control protocol (TCP), Internet protocol (IP), power line communication (PLC), Wi-Fi, infrared, general packet radio service (GPRS), global system for mobile communications (GSM), code division multiple access (CDMA), or other suitable protocols.

A user interface 320 can include a display; a positional input device, such as a mouse, touchpad, touchscreen, or the like; a keyboard; or other suitable human or machine interface devices. The user interface 320 can be coupled to the processor 302 via the bus 304. Other interface devices that permit a user to program or otherwise use the system 300 can be provided in addition to or as an alternative to a display. In some implementations, the user interface 320 can include a display, which can be a liquid crystal display (LCD), a cathode-ray tube (CRT), a light emitting diode (LED) display (e.g., an organic light emitting diode (OLED) display), or other suitable display. In some implementations, a client or server can omit the peripherals 314. The operations of the processor 302 can be distributed across multiple clients or servers, which can be coupled directly or across a local area or other suitable type of network. The memory 306 can be distributed across multiple clients or servers, such as network-based memory or memory in multiple clients or servers performing the operations of clients or servers. Although depicted here as a single bus, the bus 304 can be composed of multiple buses, which can be connected to one another through various bridges, controllers, or adapters.

A non-transitory computer readable medium may store a circuit representation that, when processed by a computer, is used to program or manufacture an integrated circuit. For example, the circuit representation may describe the integrated circuit specified using a computer readable syntax. The computer readable syntax may specify the structure or function of the integrated circuit or a combination thereof. In some implementations, the circuit representation may take the form of a hardware description language (HDL) program, a register-transfer level (RTL) data structure, a flexible intermediate representation for register-transfer level (FIRRTL) data structure, a Graphic Design System II (GDSII) data structure, a netlist, or a combination thereof. In some implementations, the integrated circuit may take the form of a field programmable gate array (FPGA), application specific integrated circuit (ASIC), system-on-a-chip (SoC), or some combination thereof. A computer may process the circuit representation in order to program or manufacture an integrated circuit, which may include programming a field programmable gate array (FPGA) or manufacturing an application specific integrated circuit (ASIC) or a system on a chip (SoC). In some implementations, the circuit representation may comprise a file that, when processed by a computer, may generate a new description of the integrated circuit. For example, the circuit representation could be written in a language such as Chisel, an HDL embedded in Scala, a statically typed general purpose programming language that supports both object-oriented programming and functional programming.

In an example, a circuit representation may be a Chisel language program which may be executed by the computer to produce a circuit representation expressed in a FIRRTL data structure. In some implementations, a design flow of processing steps may be utilized to process the circuit representation into one or more intermediate circuit representations followed by a final circuit representation which is then used to program or manufacture an integrated circuit. In one example, a circuit representation in the form of a Chisel program may be stored on a non-transitory computer readable medium and may be processed by a computer to produce a FIRRTL circuit representation. The FIRRTL circuit representation may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit.

In another example, a circuit representation in the form of Verilog or VHDL may be stored on a non-transitory computer readable medium and may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit. The foregoing steps may be executed by the same computer, different computers, or some combination thereof, depending on the implementation.

Figure 4:
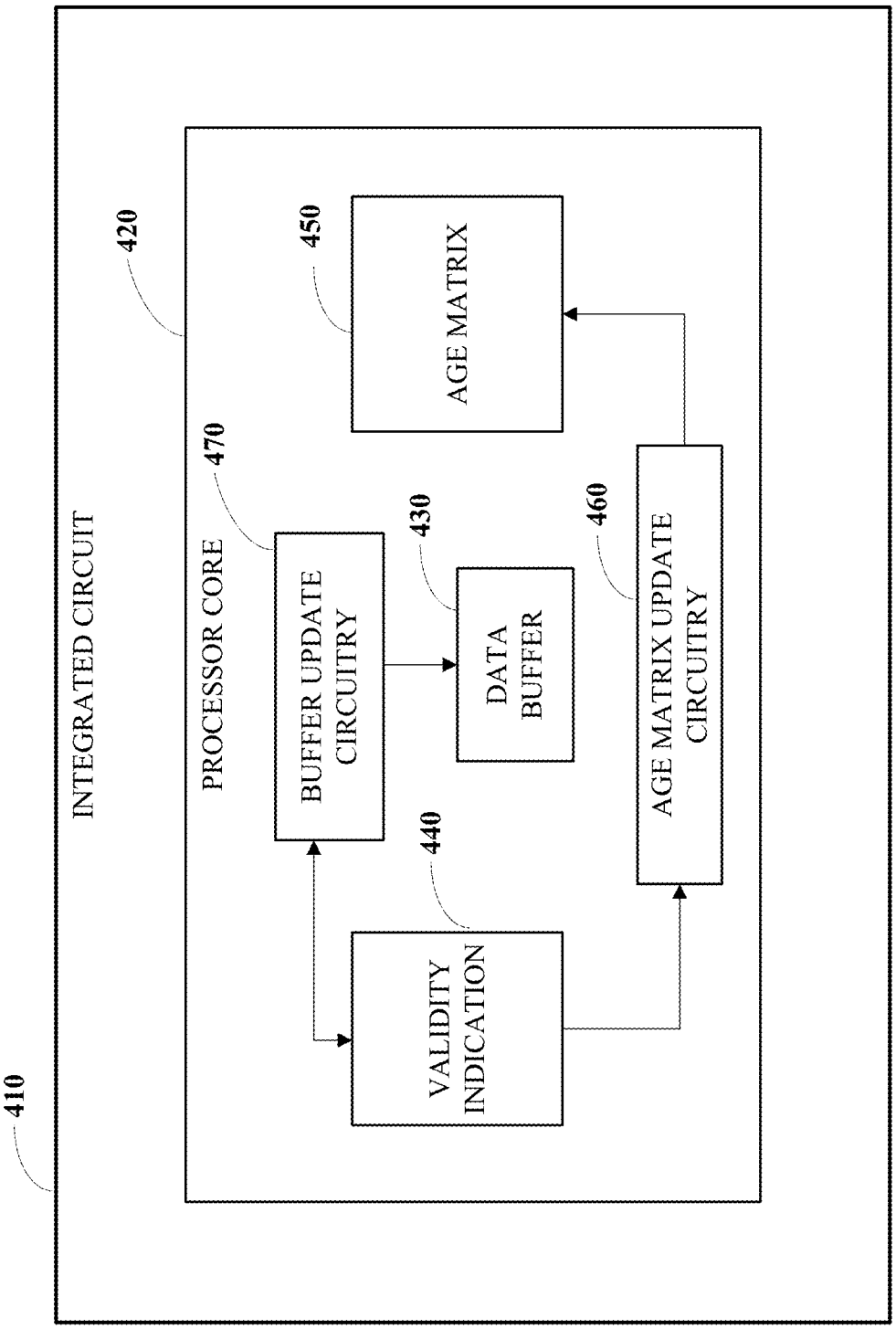
FIG. 4 is a block diagram of an example of an integrated circuit including circuitry for tracking the relative age of buffer entries in a processor core.

FIG. 4 is a block diagram of an example of an integrated circuit 410 including circuitry for relative age tracking for entries in a buffer in a processor core 420. While FIG. 4 illustrates the circuitry as a part of the processor core 420, the circuitry can be used in other component of computing devices such as microprocessors, memory components, cache components, or other components of a computing device. The circuitry described in this disclosure is generally applicable to any electronic device that implements a buffer requiring relative age tracking for entries in a buffer.

The processor core 420 includes a data buffer 430, a validity indication 440, an age matrix 450, an age matrix update circuitry 460, and a buffer update circuitry 470. The data buffer 430 stores values in entries that can be written to or read out in any order by referencing the entry location, such as by using an index. The validity indication 440 (e.g., the valid bit mask 502) identifies valid entries in the data buffer 430. In some implementations, the validity indication 440 stores bits corresponding to respective entries in the data buffer 430 that indicate whether a respective entry in the data buffer 430 currently stores valid data, i.e., valid entries. An entry that is invalid may be considered to be an empty entry. For example, the validity indication 440 may store single bits indexed to the entries in the data buffer 430. A value of 1 can indicate that an entry is valid, and a value of 0 can indicate that an entry is not valid or empty. The use of a value of 1 for valid entries and a value of 0 for invalid entries can be advantageous as a single AND operation between the validity indication 440 and the data buffer 430 will result in only the valid entries. The age matrix 450 has age matrix entries that track the relative ages of the values in each entry relative to one another. When a specific value is needed, the entries in the data buffer 430 can be directly accessed using an address to read out the entry. If the oldest value or the newest value from amongst a subset of the entries is needed, the validity indication 440 and the age matrix 450 can be used to identify which of the entries contains the oldest value or the newest candidate value from this subset, whichever is required. For instance, performing an AND operation for each row in the age matrix 450 indexed to a valid entry will leave only the row with all values of 1 indicating that the valid entry indexed to the row is the oldest. In some implementations, the validity indication 440 may store multiple bits of information per entry in the data buffer and multiple values of those bits of information may indicate that a corresponding entry on the data buffer is valid. For example, a 3-bit field in the validity indication 440 taking 8 possible values, where only one or two of those possible values indicate that the corresponding entry in the data buffer is invalid.

The data buffer 430 is a data structure that stores values in entries and as described previously, can be represented as data array having a single column and with each row corresponding to an entry in the data buffer 430. Each entry can have an address for direct access. The data buffer 430 can be written to by multiple writers such as in an out-of-order processor core or a complex cache. The data buffer 430 can store cache lines in a complex cache. A reader of the data buffer 430 can reference the address of a specific entry to read out when a specific value is needed, or the reader can use the age matrix 450 to find the entry storing the oldest or newest candidate value from amongst some subset of entries in the data buffer 430.

In some implementations, the validity indication 440 (e.g., the valid bit mask 502) is a data structure that stores a bit for each entry of the data buffer 430 and that indicates whether the value stored in the entry is valid. A valid entry is an entry that stores a current value, whereas an invalid entry does not store a current value. For example, the validity indication 440 may be represented as a multi-row, single column matrix with rows indexed to the rows of the data buffer 430 such that the bit at row i of the validity indication 440 indicates whether the entry at row i of the data buffer 430 is valid. When a value is written to an entry at row i, the validity indication 440 at row i is updated to indicate that the entry at row i is valid. When a value at row i is no longer needed, such as when it has been deleted, the validity indication 440 at row i can be updated to indicate that the entry is no longer valid.

The integrated circuit 410 includes an age matrix 450 having age matrix entries identified by rows and columns corresponding to respective entries in the data buffer. The age matrix 450 is a data structure that stores bits representing the relative age of each value stored at an entry in the data buffer 430 compared to the other values stored at other entries in the data buffer 430. The age matrix 450 can be represented as a matrix with rows indexed to the rows of the data buffer 430 and the row of the validity indication 440 such that row i of the matrix corresponds to row i of the data buffer 430 and row i of the validity indication 440 and columns that are indexed to the rows of the data buffer 430 and the validity indication 440 such that column j of the matrix corresponds to row j of the data buffer. Each entry, identified by the rows and columns and represented as (i,j) where i is the row index and j is the column index, in the age matrix 450 indicates whether the value stored in the entry indexed to row(i) is older than the entry indexed column(j). Age matrix entries having the same row number and column number, i.e., i=j are not evaluated since a value cannot be older than itself. Note that the age matrix 450 is anti-symmetric about the diagonal formed by the age matrix entries where i=j and therefore only half of the age matrix 450 needs to be stored in hardware. For example, the bit of age matrix entry(i,j) can be easily found as the value of !age matrix entry(j,i). Typically, only the lower-left triangle is stored but the following examples illustrate the entire age matrix 450 for clarity. Therefore, when evaluating a row to determine the relative age of the values corresponding to the row, the age bits can be found as follows from hardware storing only the lower-left triangle values:

When $i<j$ then age$(i,j)$=age matrix entry$(i,j)$ and if
$i>j$ then age$(i,j)$=!age matrix entry$(j,i)$.

The age matrix update circuitry 460 is configured to pre-compute all age matrix entries in the age matrix 450 corresponding to invalid entries of the data buffer based on the values of the bits in the validity indication 440. To update the age matrix 450 the age matrix update circuitry 460 applies the formula shown in the table below.

|  |  | Valid(j) | !Valid(j) |
|---|---|---|---|
| AgeMatrix(i,j)= | Valid(i) | AgeMatrix(i,j) | 1 |
|  | !Valid(i) | 0 | i < j |

Assuming that the circuitry implementing the age matrix 450 stores only the lower left-hand triangle of the age matrix 450, the formula shown in the above table can be expressed as two gates applied to the current registers as shown below:

When $i<j$: AgeMatrix$(i,j)$=(AgeMatrix$(i,j)$&& Valid$(i)$)||!Valid$(j)$

Thus, each age matrix entry is assigned a value of 1 if the current bit is 1 and the age matrix entry lies in a valid row, or if the current bit is 1 and the age matrix entry lies in a non-valid column, otherwise the age matrix entry is assigned a value of 0. This will be described in more detail in the following figures that illustrate an age matrix 450 being updated according to the formula above. Of note, the following examples show the entire age matrix 450 which can be found using the following formula:

When $i<j$: AgeMatrix$(i,j)$=!AgeMatrix$(j,i)$

The buffer update circuitry 470 is responsible for selecting entries in the data buffer 430 to store values and for updating the validity indication 440 when a value is stored in an entry, or an entry is invalidated. The buffer update circuitry 470 can select an entry in the data buffer 430 with the lowest index from among a set of invalid entries of the data buffer as identified by the validity indication 440, store the new data in the selected entry of the data buffer 430, and set a bit of the validity indication 440 corresponding to the selected entry to identify the entry as storing valid data.

FIGS. 5A through 5G illustrate an example of a data structure 500 for relative age tracking of entries in a buffer using an age matrix update circuitry, e.g., the age matrix update circuitry 460 of FIG. 4 and the changes in the data structure 500 as entries are added to a data buffer. The data structure 500 comprises a valid bit mask 502, an age matrix 504, an optionally a data buffer 506 (while the data buffer 506 is required to store the values, the data buffer 506 itself is actually not involved in the tracking of relative ages. However, it is shown in the figures for clarity). Like the example of FIG. 1, the valid bit mask 502 and the age matrix 504 each contain bits in entries arranged in columns and rows with each age matrix entry indexed to entries in the data buffer 506. (The valid bit mask 502 includes a single column, while the age matrix 504 include multiple columns mapped to each entry.) Index values of the rows and columns and labels of the data values are shown in the figures for clarity. The age matrix 504 is updated by the age matrix update circuitry based on the current bits in the valid bit mask 502.

In FIG. 5A, the data buffer 506 does not have any valid entries and every row in the valid bit mask 502 has a value of 0, indicating that the entries are invalid. The age matrix update circuitry applies the two gates to each age matrix entry of the age matrix 504 and since there are no valid entries, the age matrix update circuitry fills the age matrix 504 with values of 0 in the lower-left triangle and values of 1 in the upper-right triangle. The age matrix 504 in this state can be considered initialized. In this state, as long as values stored in the entries of the data buffer 506 are stored in ascending order of the index, the age matrix 504 accurately represents the relative age of the values stored in the entries without the age matrix 504 being updated.

FIG. 5B illustrates the data buffer 506 after being updated to store the values of Alice in the entry indexed to row 1 and Bob in the entry indexed to row 8. The valid bit mask 502 is updated to show that entry(1) and entry(8) are valid. The age matrix 504 has not been updated and still shows the same state as in FIG. 5A. The age matrix 504 is valid for determining the oldest value as represented by all values of 1 in row(1) for the valid columns column(1), column(2). At this time, the age matrix 504 needs to be updated before storing any other values in the data buffer 506 because there are not any entries located below row(8). The age matrix update circuitry updates the age matrix 504 before storing of the values for Alice and Bob. In some implementations, the age matrix update circuitry updates age matrix 504 based on receiving a signal to update the age matrix 504, such as from separate circuitry in a processor core.

FIG. 5C illustrates the age matrix 504 after being updated by the age matrix update circuitry based on the valid bit mask 502 of FIG. 5B. The only age matrix entries that need to be updated are those that have a mix of valid and invalid rows and columns and that correspond to the newly valid entry. Thus, row(8) is updated at columns 2 through 7 and column 8 is updated at rows 2 through 7. The age matrix 504 as shown in FIG. 5C is correct for any newly valid entries in the data buffer as long as the values are written to in the ascending order of the index.

FIG. 5D illustrate a new value of Charles being added to entry(5) in the data buffer 506. No update is necessary to the age matrix 504 to correctly reflect the relative age of the entries. For example, row(1) has a value of 1 for valid columns column(5), column(8) indicating that the entry(1) is the oldest and row(5) has a value of 0 for valid columns column(1), column(8) indicating that the entry(5) is the youngest, and row(8) has a mix of a value of 0 for column(1) and a value of 1 for column(5) indicating that entry(8) stores neither the youngest nor the oldest value.

The data buffer 506 with the age matrix 504 as shown in FIG. 5D can accept new values at entry(6) and entry(7) without requiring an update to the age matrix 504. However, if a value is stored in any of entry(2) through entry(4) before updating the age matrix 504, the age matrix 504 would be invalid. For instance, if a value were stored in entry(2) the age matrix 504 would incorrectly identify entry(2) as being older than entry(5). Although the data buffer 506 is still accurate for values stored at entry(6) and entry(7) without updating the age matrix 504, in some instances it may be advantageous to update the age matrix 504 even though there is not a need. For example, since the age matrix update circuitry is decoupled from writing the entries in the data buffer, the age matrix update circuitry can update the age matrix 504 when the data buffer 506 is otherwise idle, freeing up more entries that can be written to before updating the age matrix 504. In some implementations, the age matrix update circuitry can update the age matrix 504 in response to a signal indicating that the data buffer is idle.

FIG. 5E illustrates the age matrix 504 as updated by the age matrix update circuitry based on the valid bit mask 502 of FIG. 5D. Column(5), corresponding to the fifth entry in the data buffer 506, has the entries with values of 1 flipped to values of 0 for row(2) through row(4) and row(5) has the bits for column(2) through column(4) flipped from values of 0 to values of 1. The age matrix 504 in this state can is accurate for newly valid entries in the data buffer 506 as long as the new entries are written to in ascending order. For example, FIG. 5F illustrates the age matrix 504 of FIG. 5E with a new value, David stored in entry(2) of the data buffer 506. Row(2) of the age matrix 504 has all values of 0 in the valid columns, indicating that entry(2) is the newest valid entry.

The data buffer 506 can store values at multiple entries without the age matrix 504 being updated and the age matrix 504 will continue to reflect the correct relative age of the valid entries. The data buffer 506 can skip storing a value at an entry if the entry is already storing a valid value and the age matrix 504 will continue to be accurate so long as the entries are written to in order. For example, FIG. 5G illustrates the data structures of FIG. 5F with new values Eric, Fiona, and George being stored at entries(3), entry(4), and entry(6). Entry(6) is the newest valid entry, and this can be confirmed by the age matrix 504 in which row(6) contains a value of 0 for every valid column.

Figure 6:
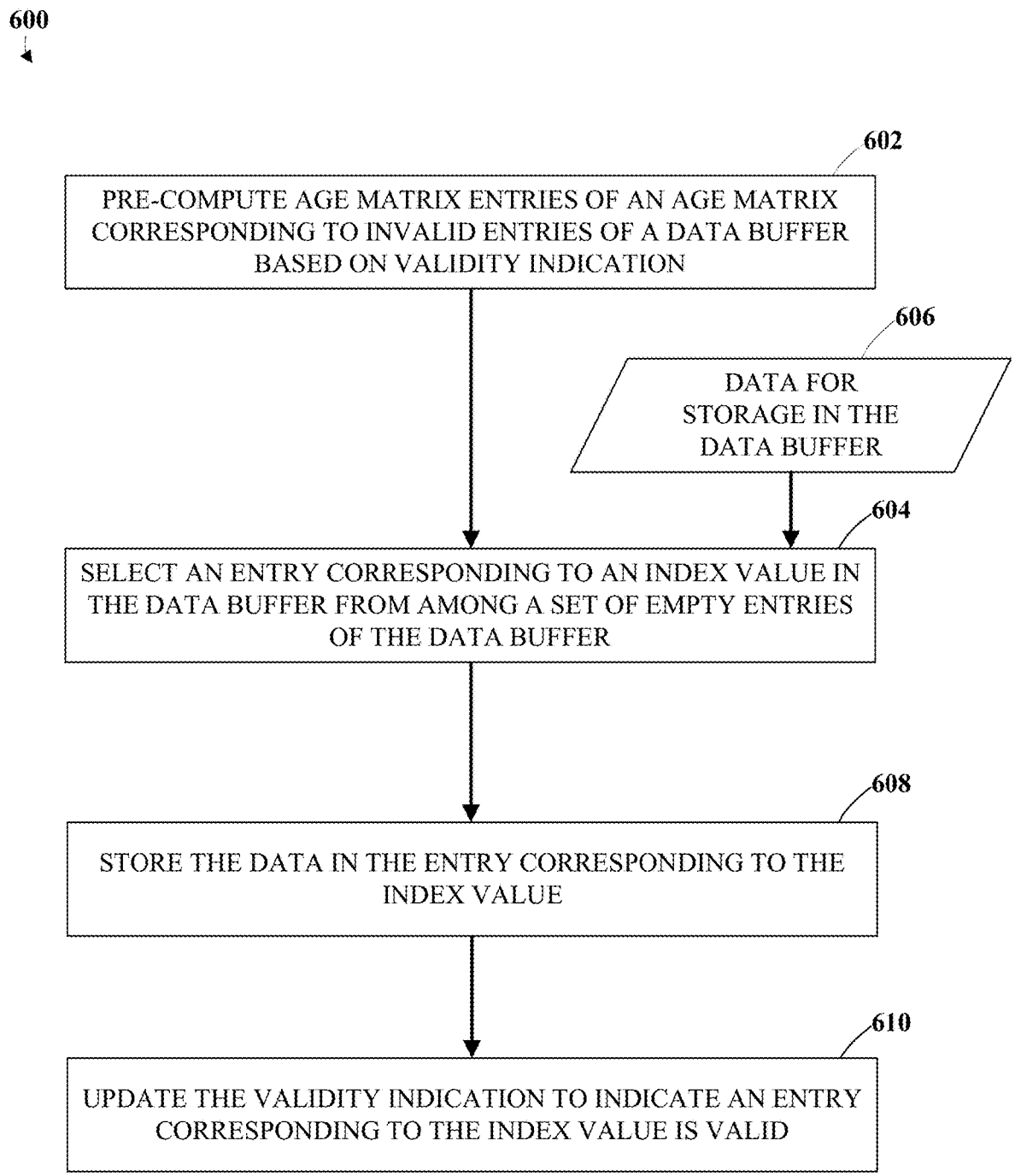
FIG. 6 is a flow chart of an example of a technique for relative age tracking for entries in a buffer.

FIG. 6 is a flowchart of an example of a technique 600 for relative age tracking for entries in a buffer. The technique 600 can be executed using an integrated circuit, such as the integrated circuit 400 of FIG. 4. The technique 600 can be performed, for example, an integrated circuit buffering data that need needs to be accessed both out of order and in order. The steps, or operations, of the technique 600 or another technique, method, process, or algorithm described in connection with the implementations disclosed herein can be implemented directly in hardware, firmware, software executed by hardware, circuitry, a software simulation, or a combination thereof.

The technique 600 includes pre-computing 602 age matrix entries of an age matrix corresponding to invalid entries of a data buffer based on validity indication values. Pre-computing 602 age matrix entries of an age matrix can be performed by an age matrix update circuitry as described in relation to FIGS. 4 and 5. A technique for pre-computing age matrix entries of an age matrix will be described in relation to FIG. 7.

Returning to FIG. 6, the technique 600 includes selecting 604 an entry corresponding to an index value in the data buffer from among a set of invalid entries of the data buffer. Selecting 604 the first entry can be performed responsive to data 606 being received for storage in the storage buffer. Selecting 604 the first entry can be performed by an integrated circuit as described in relation to FIGS. 4 and 5. In some implementations, the entry can be selected based on an invalid entry having the lowest index value.

The technique 600 includes storing 608 the data in the entry corresponding to the index value. Storing 608 the data can be performed by an integrated circuit as described in relation to FIGS. 4 and 5.

The technique 600 includes updating 610 the validity indication to indicate that an entry of the data buffer corresponding to the index value is valid. In some implementations the bit can be set to a digital 1 bit to indicate that the entry is valid. For example, updating 610 the validity indication may be performed by an integrated circuit as described in relation to FIGS. 4 and 5. In some implementations, the validity indication is a valid bit mask (e.g., the valid bit mask 502), and updating the validity indication to indicate that the entry corresponding to the index value is valid includes setting a bit of the valid bit mask corresponding to the index value.

In some implementations, the technique 600 further includes, responsive to new data being received for storage in the data buffer, selecting a second entry in the data buffer corresponding to a second value greater than the first index value from among the set of invalid entries of the data buffer, storing the second data in the second entry corresponding to the second index value in the data buffer, setting a second bit of the valid bit mask corresponding to the second index value, and pre-computing age matrix entries of the age matrix corresponding to invalid entries of the data buffer based on the valid bit mask values. The data is received after pre-computing age matrix entries of the age matrix, the second data is received after the first data, and the computing age matrix entries of the age matrix is performed after receiving the data and the second data. In some implementations, the age matrix entries of the age matrix are the same before receiving the data and after receiving the second data.

In some implementations, the age matrix only stores values that are below a diagonal defined by age matrix entries in which an index value of a respective row equals an index value of a respective column. In some implementations, the data buffer is a component of an out-of-order processor core. In some implementations, the age matrix is updated in response to an entry in the data buffer being invalidated or response to receiving a signal to update the age matrix.

FIG. 7 is a flowchart of an example of a technique 700 for pre-computing age matrix entries of an age matrix corresponding to invalid entries of a data buffer based on a validity indication for entries in the data buffer. The technique 700 may be performed by age matrix update circuitry in response to an entry being invalidated in a data buffer or in response to receiving a signal to update the age matrix. The technique 700 may be performed as part of a technique 600 described in relation to FIG. 6. The technique 700 can be executed using an integrated circuit, such as the integrated circuit 400 of FIG. 4. The technique 700 can be performed, for example, by an integrated circuit operable to buffer data that need needs to be accessed both out of order and in order. The steps, or operations, of the technique 700 or another technique, method, process, or algorithm described in connection with the implementations disclosed herein can be implemented directly in hardware, firmware, software executed by hardware, circuitry, a software simulation, or a combination thereof.

The technique 700 includes at 702, for each age matrix entry having a row index corresponding to an index of a valid entry of the data buffer and a column index corresponding to an index of an invalid entry of the data buffer, setting an age bit of the age matrix entry to a first value indicating that data stored in a first entry having a first index corresponding to the row index of the age matrix entry is older than data stored in a second entry having a second index corresponding the column index of the age matrix entry.

The technique 700 includes at 704, for each age matrix entry having a row index corresponding to an index of an invalid entry of the data buffer and a column index corresponding to an index of a valid entry of the data buffer, setting an age bit of the age matrix entry to a second value indicating that the data stored in a first entry having a first index corresponding to the row index of the age matrix entry is older than data stored in a second entry having a second index corresponding to the column index of the age matrix entry.

The technique includes at 706, for each age matrix entry having a row index corresponding to an index of an invalid entry of the data buffer, a column index corresponding to an index of an invalid entry of the data buffer, and wherein the row index is lower than the column index, set an age bit of the age matrix entry to the first value.

The described systems, integrated circuits, and techniques are advantageous in that they allow the updating of an age matrix to be before storing a new value in an entry in a buffer. Additionally, the technique allows the age matrix to be updated using minimal computations. These features are particularly useful in a multi-writer situation, such as an out-of-order core or a complex cache. The benefits of these technique may be realized in increased work doing done per cycle in a processor core.

A non-transitory computer readable medium may store a circuit representation that, when processed by a computer, is used to program or manufacture an integrated circuit. For example, the circuit representation may describe the integrated circuit specified using a computer readable syntax. The computer readable syntax may specify the structure or function of the integrated circuit or a combination thereof. In some implementations, the circuit representation may take the form of a hardware description language (HDL) program, a register-transfer level (RTL) data structure, a flexible intermediate representation for register-transfer level (FIRRTL) data structure, a Graphic Design System II (GDSII) data structure, a netlist, or a combination thereof. In some implementations, the integrated circuit may take the form of a field programmable gate array (FPGA), application specific integrated circuit (ASIC), system-on-a-chip (SoC), or some combination thereof. A computer may process the circuit representation in order to program or manufacture an integrated circuit, which may include programming a field programmable gate array (FPGA) or manufacturing an application specific integrated circuit (ASIC) or a system on a chip (SoC). In some implementations, the circuit representation may comprise a file that, when processed by a computer, may generate a new description of the integrated circuit. For example, the circuit representation could be written in a language such as Chisel, an HDL embedded in Scala, a statically typed general purpose programming language that supports both object-oriented programming and functional programming.

In an example, a circuit representation may be a Chisel language program which may be executed by the computer to produce a circuit representation expressed in a FIRRTL data structure. In some implementations, a design flow of processing steps may be utilized to process the circuit representation into one or more intermediate circuit representations followed by a final circuit representation which is then used to program or manufacture an integrated circuit. In one example, a circuit representation in the form of a Chisel program may be stored on a non-transitory computer readable medium and may be processed by a computer to produce a FIRRTL circuit representation. The FIRRTL circuit representation may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit.

In another example, a circuit representation in the form of Verilog or VHDL may be stored on a non-transitory computer readable medium and may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit. The foregoing steps may be executed by the same computer, different computers, or some combination thereof, depending on the implementation.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
   pre-computing age matrix entries of an age matrix corresponding to invalid entries of a data buffer based on a validity indication, wherein the validity indication identifies valid entries in the data buffer and the age matrix tracks relative ages of the invalid entries in the data buffer;
   responsive to data being received for storage in the data buffer, selecting an entry corresponding to an index value in the data buffer from among a set of invalid entries of the data buffer;
   storing the data in the entry corresponding to the index value; and
   updating the validity indication to indicate that the entry corresponding to the index value is valid.

2. The method of claim 1, in which the validity indication is a valid bit mask, and updating the validity indication to indicate that the entry corresponding to the index value is valid comprises:
   setting a bit of the valid bit mask corresponding to the index value.

3. The method of claim 2, wherein the data is a first data, the entry is a first entry, and the index value is a first index value, further comprising:
   responsive to second data being received for storage in the data buffer, selecting a second entry in the data buffer corresponding to a second index value greater than the first index value from among the set of invalid entries of the data buffer;
   storing the second data in the second entry corresponding to the second index value in the data buffer;
   setting a second bit of the valid bit mask corresponding to the second index value; and
   pre-computing age matrix entries of the age matrix corresponding to invalid entries of the data buffer based on the valid bit mask values; and
   wherein the first data is received after pre-computing age matrix entries of the age matrix, the second data is received after the first data, and the pre-computing age matrix entries of the age matrix is performed after receiving the first data and the second data.

4. The method of claim 3, wherein the age matrix entries of the age matrix are the same before receiving the first data and after receiving the second data.

5. The method of claim 3, wherein computing age matrix entries of the age matrix is performed responsive to a third entry in the data buffer being invalidated.

6. The method of claim 3, wherein computing age matrix entries of the age matrix is performed responsive to receiving a signal to update the age matrix.

7. The method of claim 1, wherein pre-computing age matrix entries of the age matrix comprises:
   for each age matrix entry having a row index corresponding to an index of a valid entry of the data buffer and a column index corresponding to an index of an invalid entry of the data buffer, set an age bit of the age matrix entry to a first value indicating that data stored in a first entry having a first index corresponding to the row index of the age matrix entry is older than data stored in a second entry having a second index corresponding the column index of the age matrix entry;
   for each age matrix entry having a row index corresponding to an index of an invalid entry of the data buffer and a column index corresponding to an index of a valid entry of the data buffer, set an age bit of the age matrix entry to a second value indicating that the data stored in a first entry having a first index corresponding to the row index of the age matrix entry is older than data stored in a second entry having a second index corresponding to the column index of the age matrix entry; and
   for each age matrix entry having a row index corresponding to an index of an invalid entry of the data buffer, a column index corresponding to an index of an invalid entry of the data buffer, and wherein the row index is lower than the column index, set an age bit of the age matrix entry to the first value.

8. The method of claim 1, in which the age matrix only stores age matrix entries that are below a diagonal defined by age matrix entries in which an index value of a respective row equals an index value of a respective column.

9. The method of claim 1, wherein selecting an entry comprises selecting the entry having the lowest index value from among the set of invalid entries of the data buffer.

10. An integrated circuit comprising:
a data buffer with multiple entries for storing data;
a validity indication with bits corresponding to respective entries of the data buffer and indicating whether a respective entry currently stores valid data;
an age matrix having age matrix entries identified by rows and columns corresponding to respective entries in the data buffer;
an age matrix update circuitry configured to pre-compute all age matrix entries of the age matrix corresponding to invalid entries of the data buffer based on the validity indication; and
a buffer update circuitry configured to, responsive to new data being received for storage in the data buffer, select a first entry in the data buffer with the lowest index value from among a set of invalid entries of the data buffer, store the new data in the selected entry of the data buffer, and update the validity indication to indicate that the selected entry is valid.

11. The integrated circuit of claim 10, in which the age matrix update circuitry is configured to select the first entry having the lowest index value from among the set of invalid entries of the data buffer.

12. The integrated circuit of claim 10, in which the age matrix only stores age matrix entries that are below a diagonal of the age matrix.

13. The integrated circuit of claim 10, in which the data buffer stores cache lines.

14. The integrated circuit of claim 10, in which the data buffer is a component of an out-of-order processor core.

15. The integrated circuit of claim 10, in which the age matrix update circuitry is configured to pre-compute all age matrix entries of the age matrix responsive to an entry in the data buffer being invalidated.

16. The integrated circuit of claim 10, in which the age matrix update circuitry is configured to pre-compute all age matrix entries of the age matrix responsive to receiving a signal to update the age matrix.

17. A non-transitory computer readable medium comprising a circuit representation that, when processed by a computer, is used to program or manufacture an integrated circuit comprising:
a data buffer with multiple entries for storing data;
a validity indication with bits corresponding to respective entries of the data buffer and indicating whether a respective entry currently stores valid data;
an age matrix having age matrix entries identified by rows and columns corresponding to respective entries in the data buffer;
an age matrix update circuitry configured to pre-compute all age matrix entries of the age matrix corresponding to invalid entries of the data buffer based on the validity indication; and
a buffer update circuitry configured to, responsive to new data being received for storage in the data buffer, select a first entry in the data buffer with the lowest index value from among a set of invalid entries of the data buffer, store the new data in the selected entry of the data buffer, and update the validity indication to indicate that the selected entry is valid.

18. The non-transitory computer readable medium of claim 17, in which the age matrix update circuitry is configured to pre-compute all age matrix entries of the age matrix responsive to an entry in the data buffer being invalidated.

19. The non-transitory computer readable medium of claim 17, in which the age matrix update circuitry is configured to pre-compute all age matrix entries of the age matrix responsive to receiving a signal to update the age matrix.

20. The non-transitory computer readable medium of claim 17, in which the data buffer stores cache lines.

* * * * *